(12) United States Patent
Kuroki et al.

(10) Patent No.: US 12,416,737 B2
(45) Date of Patent: Sep. 16, 2025

(54) NEUTRON DETECTION ELEMENT

(71) Applicant: HIROSHIMA UNIVERSITY, Higashihiroshima (JP)

(72) Inventors: Shinichiro Kuroki, Higashihiroshima (JP); Manabu Taniguchi, Higashihiroshima (JP); Kenta Nishigaito, Higashihiroshima (JP); Tatsuya Meguro, Higashihiroshima (JP)

(73) Assignee: HIROSHIMA UNIVERSITY, Hiroshima (JP)

( * ) Notice: Subject to any disclaimer, the term of this patent is extended or adjusted under 35 U.S.C. 154(b) by 245 days.

(21) Appl. No.: 18/266,601

(22) PCT Filed: Dec. 1, 2021

(86) PCT No.: PCT/JP2021/044054
§ 371 (c)(1),
(2) Date: Jun. 13, 2023

(87) PCT Pub. No.: WO2022/124155
PCT Pub. Date: Jun. 16, 2022

(65) Prior Publication Data
US 2024/0045087 A1    Feb. 8, 2024

(30) Foreign Application Priority Data
Dec. 11, 2020 (JP) .................. 2020-205664

(51) Int. Cl.
*G01T 3/08*    (2006.01)

(52) U.S. Cl.
CPC ..................... *G01T 3/08* (2013.01)

(58) Field of Classification Search
CPC ....................................... G01T 3/08
See application file for complete search history.

(56) References Cited

U.S. PATENT DOCUMENTS

| | | | |
|---|---|---|---|
| 2011/0127527 A1* | 6/2011 | Kub | G01T 3/08 257/E31.086 |
| 2014/0299781 A1 | 10/2014 | Hultman et al. | |
| 2016/0172396 A1* | 6/2016 | Masuda | H10F 30/292 257/295 |

(Continued)

FOREIGN PATENT DOCUMENTS

| | | |
|---|---|---|
| JP | H07-176777 A | 7/1995 |
| JP | 2012-181065 A | 9/2012 |

(Continued)

*Primary Examiner* — Hugh Maupin
(74) *Attorney, Agent, or Firm* — Maschoff Brennan (57) ABSTRACT

A neutron detection element 100 includes: a neutron detector configured to detect a neutron and convert the neutron into an electrical signal; and an amplifier configured to amplify an output of the neutron detector. The neutron detector includes: a semiconductor layer of a first conductivity type; a detector diffusion layer of a second conductivity type in the semiconductor layer; and a neutron conversion layer on the detector diffusion layer. The neutron conversion layer converts a neutron into an α-ray. The amplifier includes a plurality of transistors in the semiconductor layer. The neutron conversion layer is a metal film including a layer containing boron 10 or a layer containing lithium 6.

15 Claims, 8 Drawing Sheets

(56) References Cited

U.S. PATENT DOCUMENTS

2017/0260619 A1    9/2017   Störmer et al.
2017/0363755 A1   12/2017   Ottaviani et al.

FOREIGN PATENT DOCUMENTS

| JP | 2016-535240 A | 11/2016 |
| JP | 2018-017613 A | 2/2018 |
| JP | 2018-505396 A | 2/2018 |
| JP | 2018-141749 A | 9/2018 |
| WO | 2013/002697 A1 | 1/2013 |

\* cited by examiner

NEUTRON DETECTION ELEMENT

TECHNICAL FIELD

The present disclosure relates to a neutron detection element and a two-dimensional neutron sensor.

BACKGROUND ART

Neutrons are particles without charges and have the characteristics of passing through various substances. Neutrons are thus used in neutron radiography for observing the inside of a substance. In the use of neutrons for internal observation or treatment, detecting transmitted neutrons is important.

There is also a study using neutrons for cancer treatment, such as boron neutron capture therapy (BNCT). Even in such a case, detecting how the projected neutrons are absorbed is important.

Known techniques for neutron detection are gas discharge, scintillation, or imaging plates, for example. In recent years, a neutron detection element made of semiconductor has also been studied (see, e.g., Patent Document 1).

CITATION LIST

Patent Document

Patent Document 1: Japanese Unexamined Publication No. 2012-181065

SUMMARY OF THE INVENTION

Technical Problems

A typical neutron detection element made of semiconductor generates charged particles from neutrons and detects the generated charged particles. In generating the charged particles from neutrons, the neutrons are incident on boron 10 ($^{10}$B), for example, to generate helium nuclei (i.e., α-rays) and lithium nuclei (i.e., Li-particle beams). The α-rays and Li-particle beams incident on a depletion layer causes generation of electron-hole pairs. Thus, by measuring a current generated by the caused electron-hole pairs, the neutrons can be detected. When neutrons are incident on $^{10}$B, however, the α-rays and the Li-particle beams are emitted in opposite directions and thus incident on the depletion layer. If incident, the α-rays and the Li-particle beams cause different amounts of charges in the depletion layer. The output of the detector thus varies depending on the incident charged particle beams.

It is an objective of the present disclosure to achieve a neutron detection element made of semiconductor causing less variation in output.

Solution to the Problems

A neutron detection element according to an aspect of the present disclosure includes: a neutron detector configured to detect a neutron and convert the neutron into an electrical signal; and an amplifier configured to amplify an output of the neutron detector. The neutron detector includes: a semiconductor layer of a first conductivity type; a detector diffusion layer of a second conductivity type in the semiconductor layer; and a neutron conversion layer on the detector diffusion layer. The neutron conversion layer converts a neutron into an α-ray. The amplifier includes a plurality of transistors in the semiconductor layer. The neutron conversion layer is a metal film including a layer containing boron 10 or a layer containing lithium 6.

Advantages of the Invention

The neutron detection element according to the present disclosure allows the incidence of only α-rays on a semiconductor layer and causes less output variation.

DESCRIPTION OF EMBODIMENTS

Figure 1:
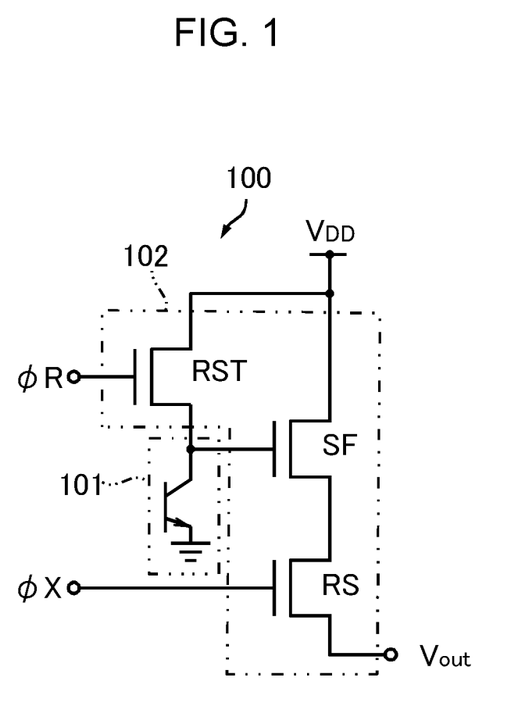
FIG. 1 is a circuit diagram showing a neutron detection element according to an embodiment.

As shown in FIG. 1, a neutron detection element 100 according to an embodiment includes a neutron detector 101 configured to detect neutrons and convert the neutrons into electrical signals, and an amplifier 102 configured to amplify the outputs of the neutron detector. The amplifier 102 includes a reset transistor (RST), a source follower transistor (SF), and a row selection transistor (RS). The neutron detection element can be driven by applying a reset signal to φR and a row selection signal to φX.

Figure 2:
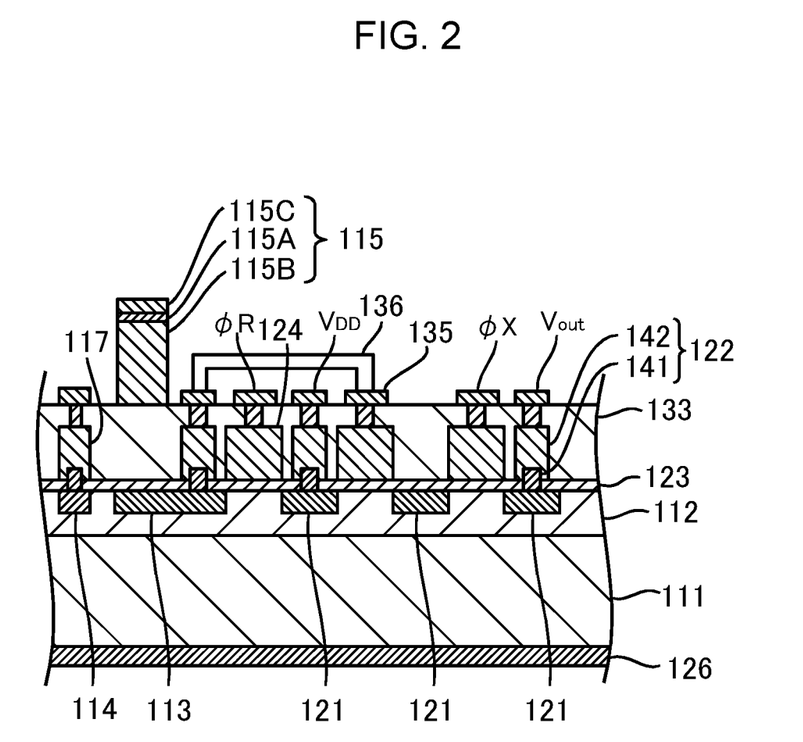
FIG. 2 is a cross-sectional view showing the neutron detection element according to the embodiment.

As shown in FIG. 2, the neutron detector 101 and the amplifier 102 are formed in a p$^-$-type semiconductor layer 112 on an n-type semiconductor substrate 111. In this embodiment, the semiconductor substrate 111 and the semiconductor layer 112 are made of silicon carbide (SiC).

The semiconductor layer 112 includes an n$^+$-type detector diffusion layer 113, source/drain diffusion layers 121, and a p$^+$-type potential stabilizing region 114. On the semiconductor layer 112, a gate insulating film 123 is formed. In a predetermined region on the gate insulating film 123, a gate electrode 124 is formed. An ohmic electrode 117 in ohmic contact with the potential stabilizing region 114, and source/drain electrodes 122 in ohmic contact with the source/drain diffusion layers 121 are also formed. The ohmic electrode 117 and the source/drain electrodes 122 include a silicide layer 141 in ohmic contact with the diffusion layers and a metal electrode layer 142 covering the silicide layer 141.

On the semiconductor layer 112, an interlayer insulating film 133 is formed to cover the electrodes. On the interlayer insulating film 133, a neutron conversion layer 115 and interconnects 135 and 136 are formed. Accordingly, the neutron detector 101 and the amplifier 102 are formed such that the amplifier 102 includes the reset transistor (RST), the source follower transistor (SF), and the row selection transistor (RS). In this embodiment, one of the source/drain diffusion layers of the reset transistor (RST) is formed integrally with the detector diffusion layer 113.

On the back surface of the semiconductor substrate 111, a back surface electrode 126 is provided. The back surface electrode 126 is an ohmic electrode in ohmic contact with the back surface of the semiconductor substrate 111 and may be made of niobium-nickel silicide, for example. The back surface electrode 126 is advantageous in quickly discharging the electron and hole carriers generated in the semiconductor substrate 111 and stabilizing device operation.

The neutron conversion layer 115 is a metal film including, as a conversion functional layer, a $^{10}B$-containing layer 115A containing boron 10 (or $^{10}B$) which is an isotope of boron. The $^{10}B$-containing layer 115A may be formed, for example, by ion implantation of $^{10}B$ or deposition of $^{10}B$ through sputtering or vapor deposition, for example. Instead of the $^{10}B$-containing layer, the conversion functional layer may be a layer containing lithium 6 ($^{6}Li$) which is an isotope of lithium.

While there is a lower metal layer 115B under the $^{10}B$-containing layer 115A and an upper metal layer 115C on the $^{10}B$-containing layer 115A in this embodiment, there may be no upper metal layer 115C. The lower metal layer 115B and the upper metal layer 115C are preferably made of metal with a relatively large atomic number in order to allow less penetration of α-rays and Li-rays. For example, the metal can be aluminum (Al), tungsten (W), or molybdenum (Mo). Among these, Al can be formed in the same manner as an Al interconnect and is thus preferably employed.

The neutrons incident on the neutron conversion layer 115 react with $^{10}B$ to generate α-rays and Li-particle beams. In the lower metal layer 115B made of Al, for example, the Li-particle beams attenuate more easily than the α-rays. Only the α-rays pass through the lower metal layer 115B and are incident on the detector diffusion layer 113 to generate electron-hole pairs in the depletion layer near the PN junction between the n$^+$-type detector diffusion layer 113 and the p-type semiconductor layer 112. The negative charges (i.e., electrons) of the generated electron-hole pairs move to the n$^+$-type detector diffusion layer 113. These charges are accumulated in the gate electrode of the SF transistor through the interconnects 135 and 136 to change the potential of this gate electrode.

In this embodiment, since there is the n-type semiconductor substrate 111 under the p-type semiconductor layer 112, a parasitic bipolar junction transistor (BJT) is further formed. The positive charges (i.e., holes) from the electron-hole pairs generated in the depletion layer are injected into the base of the parasitic BJT which is then temporarily turned on. The electrons move from the semiconductor substrate 111 through the base to the detector diffusion layer 113. Like the electrons of the electron-hole pairs generated in the depletion layer, these electrons are accumulated in the gate electrode of the SF transistor through the interconnects 135 and 136 to further change the potential of this gate electrode. At this time, a negative voltage is applied to the back surface electrode 126 of the semiconductor substrate 111. The amplification effect of the parasitic BJT then further increases, that is, the number of electrons injected from the semiconductor substrate 111 into the detector diffusion layer 113 can increase. The parasitic BJT can increase the sensitivity of the sensor. The parasitic BJT is however not necessarily needed and this sensor operates even with the detector diffusion layer 113 only.

The charges accumulated in the gate electrode of the SF transistor change the potential of this gate electrode, which results in turning the RS transistor on and then changing the output voltage in accordance with the potential of the gate electrode of the SF transistor. By measuring this potential, the number of neutrons incident on the sensor can be measured.

In this embodiment, the detector diffusion layer 113 is integral with the source/drain diffusion layer of the reset transistor (RST). The negative charges moving to the detector diffusion layer 113 are read out by the amplifier 102 and a signal is obtained which corresponds to the energy of the neutrons incident on the neutron conversion layer 115. On the other hand, the positive charges (i.e., holes) are discharged through the potential stabilizing region 114. While the parasitic BJT increases the neutron detection sensitivity, a configuration may exclude the parasitic BJT.

The neutron detection element 100 according to this embodiment detects the neutrons using only the α-rays out of the α-rays and the Li-particle beams generated by the neutrons incident on the neutron conversion layer 115. This configuration allows improvement in the quantitativity of neutrons.

In this embodiment, the neutron conversion layer 115 is formed only right above the detector diffusion layer 113, and not above the transistors or other elements forming the amplifier 102. The neutron conversion layer 115 only right above the detector diffusion layer 113 allows less α-rays emitted from the neutron conversion layer 115 to be incident on the regions of the semiconductor layer 112 other than the detector diffusion layer 113. This configuration thus causes less malfunction. While the region "right above the detector diffusion layer 113" overlaps the detector diffusion layer 113 in a plan view, the detector diffusion layer 113 and the neutron conversion layer 115 are not necessarily overlap each other completely. The neutron conversion layer 115 may be formed in a region other than the region right above the detector diffusion layer 113.

Figure 3A:
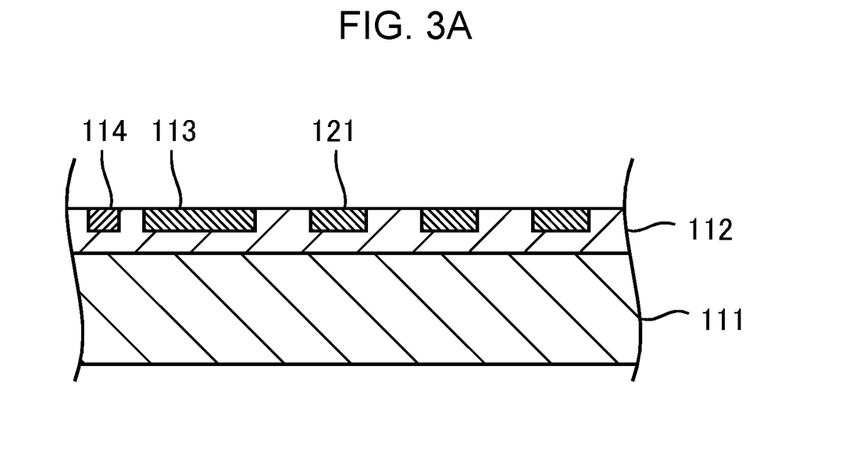
FIG. 3A is a cross-sectional view showing a manufacturing process of the neutron detection element according to the embodiment.

The silicon carbide light-receiving element according to this embodiment may be formed as follows, for example. First, as shown in FIG. 3A, the p-type semiconductor layer 112 is epitaxially grown on the n-type semiconductor substrate 111. Subsequently, n-type impurities are selectively implanted into the semiconductor layer 112 using a first ion implantation mask to form the n$^+$-type detector diffusion layer 113 and the source/drain diffusion layers 121. In addition, the p$^+$-type potential stabilizing region 114 is formed using a second ion implantation mask. After that, activation annealing is performed.

While the material of the semiconductor substrate 111 is not particularly limited but may be 4H-SiC. The semiconductor layer 112 may have a thickness ranging from about 1 μm to about 5 μm, for example. The first and second ion implantation masks may be made of a silicon oxide (SiO$_2$) film, for example. In the case of SiC semiconductor, the activation annealing may be heat treatment at a temperature of about 1700° C. after covering the semiconductor layer 112 subjected to ion implantation with a carbon cap film.

Figure 3B:
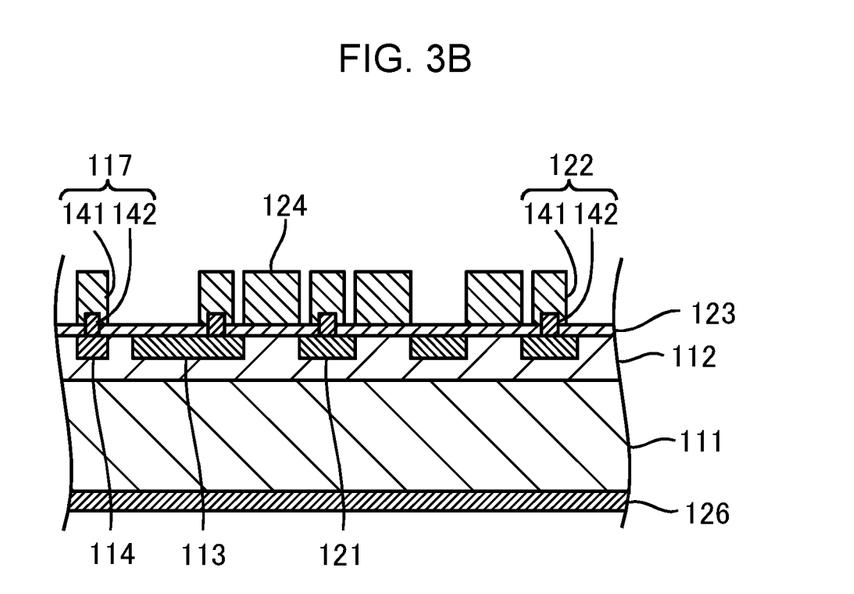
FIG. 3B is another cross-sectional view showing the manufacturing process of the neutron detection element according to the embodiment.

Next, as shown in FIG. 3B, thermal oxidation is performed to form the gate insulating film 123 with a thickness of about 20 nm and then form the ohmic electrode 117, the source/drain electrodes 122, the gate electrode 124, and the back surface electrode 126. The ohmic electrode 117 and the source/drain electrodes 122 may include the silicide layer 141 and the metal electrode layer 142, for example. The silicide layer 141 may be formed as follows, for example. A metal film to serve as the silicide layer 141 is selectively formed by lift-off using a resist mask and then silicified by heat treatment. The metal film in this case may be a niobium-nickel film, for example, but may be a film, such as a nickel-molybdenum alloy film, made of another metal that forms silicide. The metal electrode layer 142 may be formed as follows. A metal film made of Al, for example, is formed to cover the silicide layer 141 and selectively removed by etching. The metal electrode layer 142 and the gate electrode 124 may be formed by the same process. The metal electrode layer 142 and the gate electrode 124 may be made of titanium nitride or polysilicon, for example. The back surface electrode 126 may be formed as follows. A metal film, such as a niobium-nickel film, is formed on the back surface of the semiconductor substrate 111 and then silicified.

Figure 3C:
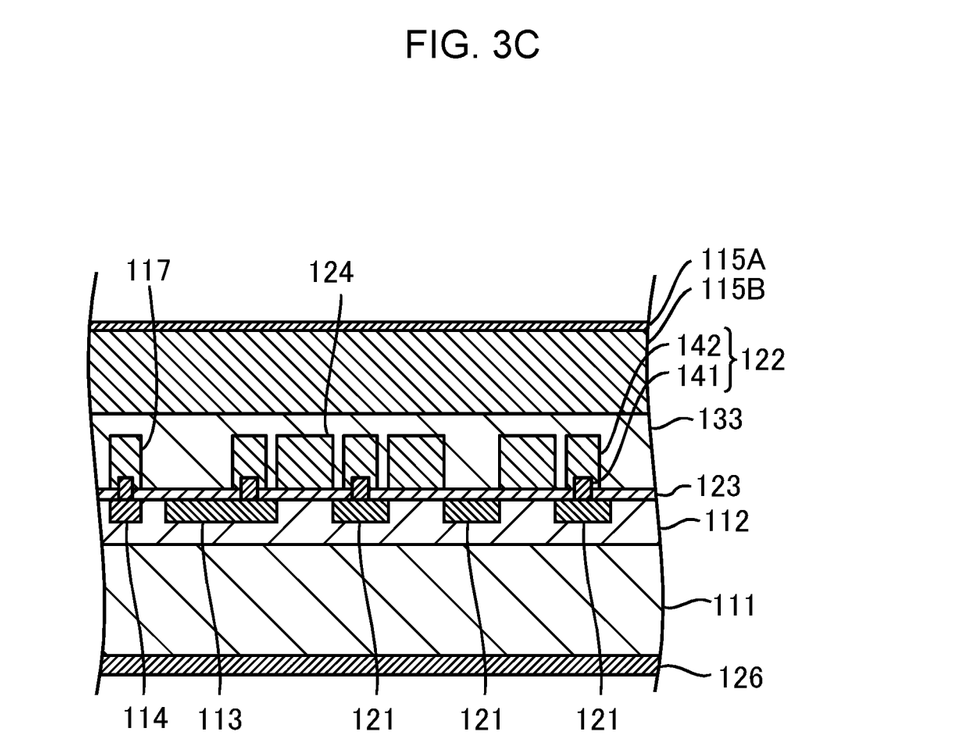
FIG. 3C is still another cross-sectional view showing the manufacturing process of the neutron detection element according to the embodiment.

Next, as shown in FIG. 3C, the interlayer insulating film 133 made of silicon oxide, for example, is formed on the entire surface of the semiconductor substrate 111, and the lower metal layer 115B is formed on the interlayer insulating film 133. The thickness of the interlayer insulating film 133 influences the incidence of the α-rays emitted from the neutron conversion layer 115 on the detector diffusion layer 113 and may be about 1 μm, for example. After that, $^{10}$B is ion-implanted into the lower metal layer 115B to form the $^{10}$B-containing layer 115A which serves as an impurity diffusion layer. The lower metal layer 115B may be any metal layer that attenuates the Li-particle beams and may be made of aluminum, tungsten, or molybdenum, for example. The $^{10}$B-containing layer 115A is not necessarily formed by ion implantation and may be formed by depositing $^{10}$B thorough sputtering or vapor deposition, for example. The lower metal layer 115B has a thickness allowing the transmission of no Li-particle beams but the α-rays. The thickness may be determined as appropriate in accordance with the type of the used metal. For example, in the case of aluminum, the thickness may range from about 2 μm to about 4 μm. In the case of tungsten, the thickness may be about 0.4 μm. When forming the $^{10}$B-containing layer 115A by ion implantation, the amount of implantation may range from about $1 \times 10^{15}$ cm$^{-2}$ to about $4 \times 10^{15}$ cm$^{-2}$. The thickness of the upper metal layer 115C is not particularly limited but may range from about 10 nm to about 1000 nm in the case of aluminum, for example. The $^6$Li-containing layer may be formed similarly.

Figure 3D:
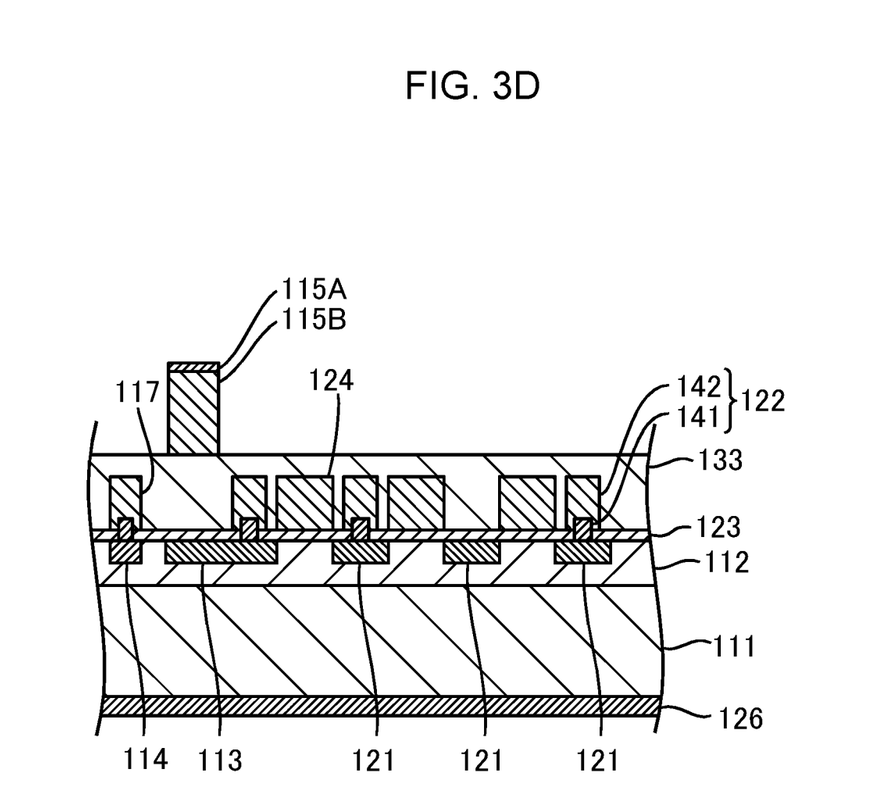
FIG. 3D is yet another cross-sectional view showing the manufacturing process of the neutron detection element according to the embodiment.
Figure 3E:
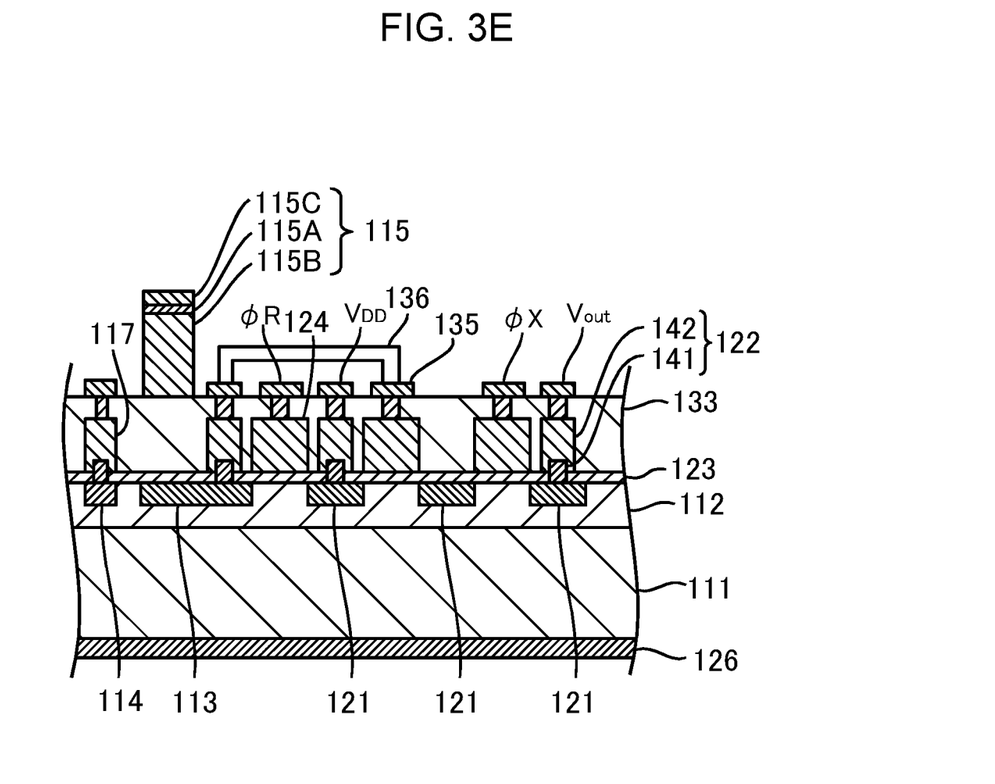
FIG. 3E is further another cross-sectional view showing the manufacturing process of the neutron detection element according to the embodiment.

Next, as shown in FIG. 3D, the lower metal layer 115B with the $^{10}$B-containing layer 115A formed thereon is selectively removed except for the region right above the detector diffusion layer 113. Next, as shown in FIG. 3E, the upper metal layer 115C and the interconnects 135 and 136 are formed. If made of the same metal, the upper metal layer 115C and the interconnects 135 and 136 can be formed by the same process.

Figure 4:
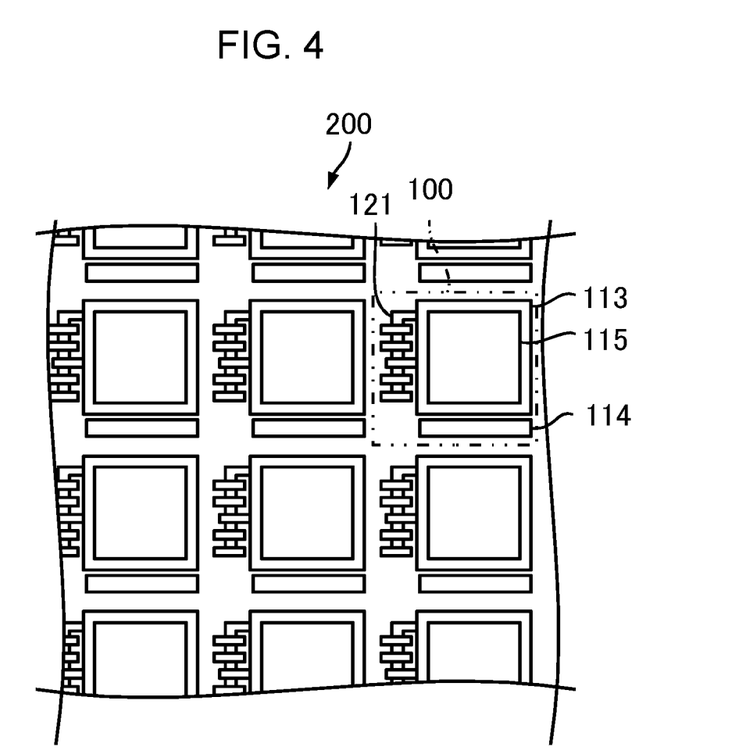
FIG. 4 is a plan view showing a two-dimensional neutron sensor according to the embodiment.

Neutron detection elements 100, each being the neutron detection element 100 according to this embodiment, may be arranged in a matrix as shown in FIG. 4 to form a two-dimensional neutron sensor 200 including the neutron detection elements 100 each serving as a pixel. With the use of the two-dimensional neutron sensor 200, the distribution of neutrons on a plane can be easily measured and the transmission and absorption of neutrons can be evaluated in real time by neutron radiography or BNCT. In addition, with an excellent quantitativity, the neutron detection element 100 according to this embodiment allows accurate visualization of the intensity distribution of neutrons.

Figure 5:
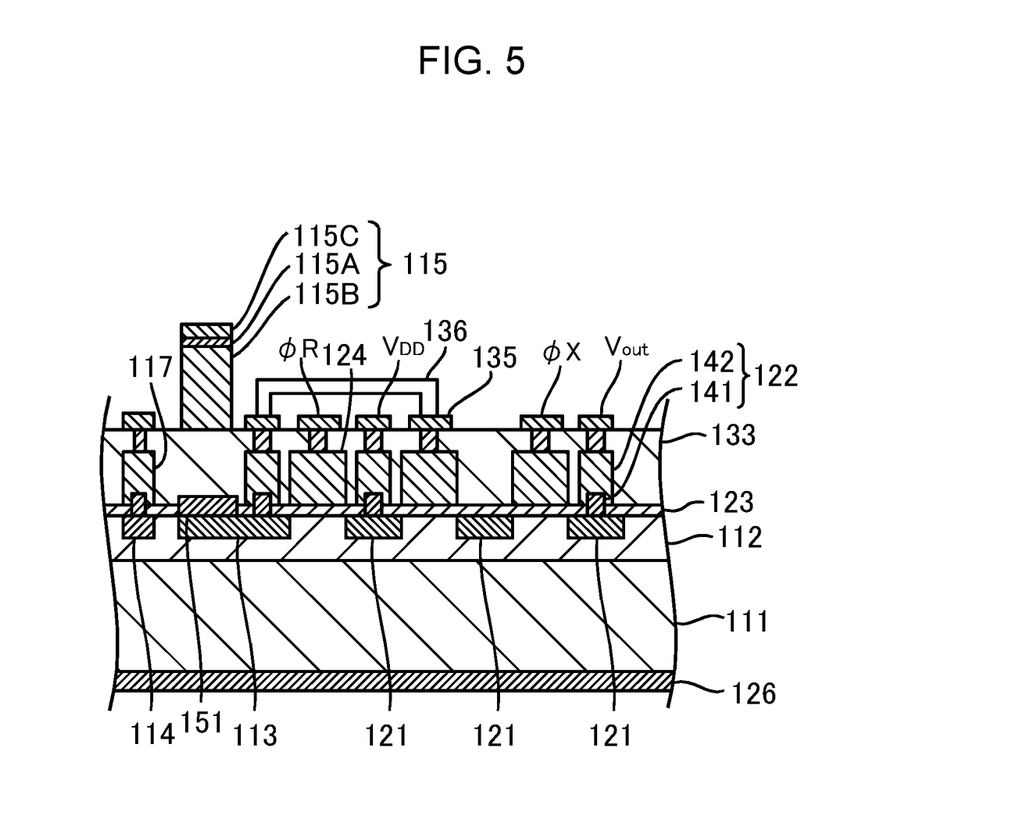
FIG. 5 is a cross-sectional view showing a neutron detection element according to a variation.

As shown in FIG. 5, a high-density layer 151 may be interposed between the neutron conversion layer 115 and the detector diffusion layer 113. The high-density layer 151 can reduce the α-rays penetrating the detector diffusion layer 113. This configuration allows further improvement in the detection sensitivity. The high-density layer 151 may be a layer having a higher density than the semiconductor layer 112, and is preferably a layer containing metal. Examples include a simple metal layer, an alloy layer containing a plurality of metals, or a layer, such as a silicide layer, containing metal and non-metal. Among these, metal with an atomic number exceeding 14 is preferably contained. In view of the handleability, nickel, niobium, titanium, cobalt, or any other suitable metal is more preferably contained. These metals are preferably also employed in view of easier formation of silicide. If made of the same silicide layer as the source/drain electrodes 122, the high-density layer can be formed without increasing the number of steps. In this case, the silicide layer 141 of the source/drain electrodes 122 and the high-density layer 151 can be formed integrally.

The high-density layer 151 is preferably in contact with the detector diffusion layer 113. Alternatively, another layer, such as an insulating film, may be interposed between the high-density layer 151 and the detector diffusion layer 113. The high-density layer 151 is preferably formed at least right under the neutron conversion layer 115 in the detector diffusion layer 113. The high-density layer 151 may cover the entire detector diffusion layer 113 or a region wider than the detector diffusion layer 113. The thickness of the high-density layer 151 is not particularly limited but preferably ranges from about 0.01 μm to about 0.3 μm in order to allow the reach of the α-rays to the detector diffusion layer but no penetration. If formed by the same procedure as the silicide layer 141 of the source/drain electrodes 122, the high-density layer 151 can have the same thickness as the silicide layer 141 of the source/drain electrodes 122.

In this embodiment, the semiconductor layer 112 is of the p-type and includes the transistors of the n-type. The semiconductor layer 112 is of the p-type and includes the p$^+$-type potential stabilizing region 114, which allows quick discharge of the holes caused by the α-rays and thus allows stabilization of the output potential of the detection element. Alternatively, the semiconductor layer 112 may be of the n-type and include the detector diffusion layer and the transistors of the p-type. In this case, the potential stabilizing region may be of the n$^+$-type. Note that the potential stabilizing region may or may not be provided as necessary. In this embodiment, the potential stabilizing region 114 is spaced apart from and adjacent to the detector diffusion layer 113. Such a configuration allows an increase in the advantage of stabilizing the potential. The potential stabilizing region 114 can be formed in any part of the semiconductor layer 112 which is the same as the detector diffusion layer 113. The sign "+" following "p" or "n" indicating the conductivity type represents a higher impurity concentration than the case without any sign, while the sign "−" represents a lower impurity concentration than the case without any sign.

As in this embodiment, the radiation resistance can be improved by using SiC semiconductor, which can largely extend the lifetime of the element. Alternatively, the element may be made of silicon semiconductor.

INDUSTRIAL APPLICABILITY

The neutron detection element according to the present disclosure causes less variation in the output and facilitates quantitative detection of neutrons, and is thus useful particularly in the medical or other field using neutrons.

DESCRIPTION OF REFERENCE CHARACTERS

100 Neutron Detection Element
101 Neutron Detector
102 Amplifier
111 Semiconductor Substrate
112 Semiconductor Layer
113 Detector Diffusion Layer
114 Potential Stabilizing Region
115 Neutron Conversion Layer
115A $^{10}$B-Containing Layer
115B Lower Metal Layer
115C Upper Metal Layer
117 Ohmic Electrode
121 Source/Drain Diffusion Layer
122 Source/Drain Electrode
123 Gate Insulating Film
124 Gate Electrode
126 Back Surface Electrode
133 Interlayer Insulating Film
135 Interconnect
136 Interconnect
141 Silicide Layer
142 Metal Electrode Layer
151 High-Density Layer
200 Two-Dimensional Neutron Sensor

The invention claimed is:

1. A neutron detection element comprising:
a neutron detector configured to detect a neutron and convert the neutron into an electrical signal; and
an amplifier configured to amplify an output of the neutron detector,
the neutron detector including: a semiconductor layer of a first conductivity type; a detector diffusion layer of a second conductivity type in the semiconductor layer; a neutron conversion layer on the detector diffusion layer, the neutron conversion layer being configured to convert a neutron into an x-ray; and a high-density layer between the neutron conversion layer and the detector diffusion layer, the high-density layer being made of a material having a higher density than the semiconductor layer,
the amplifier including a plurality of transistors in the semiconductor layer,
the neutron conversion layer being a metal film including a conversion functional layer containing boron 10 or a layer containing lithium 6.

2. The neutron detection element of claim 1, wherein the layer containing boron 10 or the layer containing lithium 6 is an impurity diffusion layer.

3. The neutron detection element of claim 1, wherein the semiconductor layer is a silicon carbide semiconductor layer.

4. The neutron detection element of claim 1, wherein the neutron conversion layer is formed right above the detector diffusion layer with an insulating film interposed therebetween.

5. The neutron detection element of claim 1, wherein the high-density layer is a metal silicide layer.

6. The neutron detection element of claim 1, wherein the neutron detector includes a potential stabilizing region of the first conductivity type in the semiconductor layer, the potential stabilizing region having a higher impurity concentration than the semiconductor layer.

7. A two-dimensional neutron sensor comprising:
neutron detection elements, each being the neutron detection element of claim 1, in a matrix.

8. A neutron detection element comprising:
a neutron detector configured to detect a neutron and convert the neutron into an electrical signal; and
an amplifier configured to amplify an output of the neutron detector,
the neutron detector including: a semiconductor layer of a first conductivity type; a detector diffusion layer of a second conductivity type in the semiconductor layer; a neutron conversion layer on the detector diffusion layer, the neutron conversion layer being configured to convert a neutron into an x-ray; and a potential stabilizing region of the first conductivity type in the semiconductor layer, the potential stabilizing region having a higher impurity concentration than the semiconductor layer,
the amplifier including a plurality of transistors in the semiconductor layer,
the neutron conversion layer being a metal film including a conversion functional layer containing boron 10 or a layer containing lithium 6,
wherein the semiconductor layer is a silicon carbide semiconductor layer.

9. The neutron detection element of claim 8, wherein the semiconductor layer is provided on a semiconductor substrate that has no buried insulator.

10. The neutron detection element of claim 1,
wherein the plurality of transistors includes transistor diffusion layers, and
wherein both of the detector diffusion layer and the transistor diffusion layers are formed in the semiconductor layer provided on a first side of a substrate.

11. The neutron detection element of claim 1,
wherein the plurality of transistors includes transistor diffusion layers, and
wherein the detector diffusion layer is integral with one of the transistor diffusion layers.

12. The neutron detection element of claim 1,
wherein the conversion functional layer is sandwiched between lower metal layer and upper metal layer.

13. The neutron detection element of claim 1,
wherein the high-density layer is a layer containing metal.

14. The neutron detection element of claim 1,
wherein the high-density layer is a silicide layer.

15. The neutron detection element of claim 1,
wherein the semiconductor layer is provided on a semiconductor substrate that has no buried insulator.

* * * * *